(12) United States Patent
Tigges

(10) Patent No.: US 6,439,044 B1
(45) Date of Patent: Aug. 27, 2002

(54) ROTARY TRANSMISSION LEADTHROUGH OF A TIRE PRESSURE CONTROL UNIT

(76) Inventor: Martin Tigges, Schlehenweg 30, D-42469 Neuss (DE)

( * ) Notice: Subject to any disclaimer, the term of this patent is extended or adjusted under 35 U.S.C. 154(b) by 15 days.

(21) Appl. No.: 09/692,501

(22) Filed: Oct. 19, 2000

(30) Foreign Application Priority Data

Oct. 19, 1999 (DE) .......................................... 199 50 191

(51) Int. Cl.$^7$ ............................................. B60C 23/02
(52) U.S. Cl. ..................................................... 73/146.2
(58) Field of Search ........................... 73/146.2, 146.5; 188/322, 322.11; 267/119, 126; 137/223, 580; 152/417

(56) References Cited

U.S. PATENT DOCUMENTS 5,472,071 A * 12/1995 Zimmermann ......... 188/322.11

FOREIGN PATENT DOCUMENTS

EP 03775611 B 10/1988

* cited by examiner

Primary Examiner—Benjamin R. Fuller
Assistant Examiner—Marissa Ferguson
(74) Attorney, Agent, or Firm—Flanagan & Flanagan; John R. Flanagan

(57) ABSTRACT

A tire pressure control unit for motor vehicles with a rotary transmission leadthrough 2 for transmitting a pressure means from a part, stationary with respect to a rotatably supported wheel 3, of the motor vehicle to the rotatably supported wheel 3, wherein the rotary transmission leadthrough 2 comprises at least one chamber 14, 15 delimited by an annular body 4, 5 disposed at the stator side and by [an annular body (4, 5)] disposed at the rotor side concentrically with respect to the rotational axis of wheel 3, and wherein for sealing the at least one chamber 14, 15 sealing rings are inserted between the stator-side annular body 4 and the rotor-side annular body 5, is defined thereby that the stator-side annular body 4 and the rotor-side annular body 5 are disposed one next to the other in the axial direction with respect to the rotational axis of the wheel 3 leaving a motion gap 11, into the face facing toward the rotor-side annular body 5, of the stator-side annular body 4 for the radial sealing of the at least one chamber 14, 15 two concentric annular grooves 20, 21 or 21, 22, respectively, are introduced, the annular grooves 20, 21 or 21, 22, respectively, with their termination facing away from the rotor-side annular body 5 are connected to a control line 25, 27 which can be activated by a pressure means, into the annular grooves 20, 21 or 21, 22, respectively, in each instance one of the sealing rings is placed, which, upon the control line 25, 27 being pressurized is moved in the direction toward the rotor-side annular body 5, and from the rotor-side annular body 5 an output line 28, 29 terminates in the at least one chamber 14, 15.

16 Claims, 4 Drawing Sheets

ROTARY TRANSMISSION LEADTHROUGH OF A TIRE PRESSURE CONTROL UNIT

BACKGROUND OF THE INVENTION

The present invention relates to a rotary transmission leadthrough of a tire pressure control unit for transmitting pressurized fluid from a stationary portion of a motor vehicle to a rotatably supported wheel of the vehicle in order to change the pressurization of the wheel.

Tire pressure control units are used in motor vehicles, in particular in commercial vehicles such as motor trucks, field tractors or earth-moving machinery, in order to be able to adapt the tire pressure to differing ground conditions—differing terrain, road, etc.—or also to differing loading conditions. As a function of the terrain to be traversed, it can be useful to travel off-road with a lower tire pressure than on hard pavement. Through differing tire pressure the contact area of the tire is changed. For example, in the case of soft ground, with a lower tire pressure as large a contact surface as feasible is provided so as to prevent sinking-in. By changing the contact area the flexing work of the tire can also be changed and be adapted to the particular condition such that unnecessary tire wear is avoided.

A tire pressure control unit according to the species is described in EP 0 377 561 B1. This prior known tire pressure control unit employs a rotary transmission leadthrough for transmitting a pressure means—compressed air for filling the tire—from the stationary part of the motor vehicle to the movably supported wheel. The rotary transmission leadthrough is formed by two concentrically disposed tube segments, between which, sealed by annular seals, are disposed two chambers with respect to the wheel one next to the other in the axial direction, relative to the rotational axis of the wheel. The one tube segment is secured on the stationary flared housing of the wheel axle and represents a stator-side annular body. The other tube segment is secured on the wheel flange and represents a rotor-side annular body. This rotary transmission leadthrough, occupying a cylindrical section behind the wheel flange, consequently extends from the wheel flange to over the axle beam. The extent of the rotary transmission leadthrough in this direction is determined by the number of chambers used, via which pressure, measurement and/or filling means are to be transmitted. Each of these chambers is sealed in the axial direction by two sealing rings. In order to attain the desired sealing, each sealing ring must be in contact on the stator-side tube segment as well as on the rotor-side tube segment.

Of disadvantage in this tire pressure control unit is the installation space required in the axial direction. Therefore, this known tire pressure control unit cannot be mounted, for example, on wheels which are connected via universal couplings such as are provided with steering axles—with a drive line.

In the two-chamber system described in EP 0 377 561 B1 the one chamber serves for transmitting a control means to a filling valve associated with the wheel, with which the filling valve can be opened and closed, for example pneumatically. The further chamber serves for transmitting the pressure means for filling or also for venting the tire. Apart from this two-chamber system, feed-in systems are also known in which the compressed air line is guided through the hub and bearing of the wheel. In this system, two annular bodies disposed concentrically with respect to one another are also provided wherein the one body is supported stationarily and the other body rotatably with respect to it. However, this system has the disadvantage that the compressed air line and also the chamber must be guided through the oil-filled hub and bearing. Leakages on the rotary transmission leadthrough lead to the fact that air penetrates into the oil and thus the lubrication and cooling effect of the oil can be impaired to the point that this can lead to the destruction of the hub and bearing.

Both of the systems described have in common that in them contact seals are used, which, in particular in the case of motor vehicles not moved for a relatively long time period, such as for example military vehicles, adhesion of the seal with the adjoining annular body can occur. When the motor vehicle is subsequently moved, this annular seal is torn from the annular body. Even if this does not lead to a destruction of the sealing ring, the sealing effect is at least considerably impaired. This adhesion is also referred to as slip-stick effect.

The invention is therefore based on the task of further developing a tire pressure control unit according to the species such that with it the [sealing] tightness of the tire pressure control unit is improved and the tire pressure control unit is also suitable for installation in such motor vehicles in which only a small installation space is available in the axial direction of the wheel.

SUMMARY OF THE INVENTION

The invention is therefore based on the task of further developing a tire pressure control unit according to the species such that with it the sealing tightness of the tire pressure control unit is improved and the tire pressure control unit is also suitable for installation in such motor vehicles in which only a small installation space is available in the axial direction of the wheel.

This task is solved according to the invention thereby that the stator-side annular body and the rotor-side annular body in the axial direction relative to the rotational axis of the wheel are disposed such that they are adjacent to one another, leaving a motion gap, into the face, directed toward the rotor-side annular body, of the stator-side annular body for the radial sealing of the at least one chamber two concentric annular grooves are introduced, the annular grooves with their termination facing away from the rotor-side annular body are connected to a control line which can be activated by a pressure means, into the annular grooves are each placed one of the sealing rings, which upon pressurization is moved in the direction toward the rotor-side annular body, and from the rotor-side annular body into the at least one chamber terminates an output line.

The tire pressure control unit according to the invention provides that the two annular bodies are disposed in an axial and not, as is the case in the known prior art, in a concentric disposition with respect to one another. The number of the width of the chambers employed, therefore, does not add to the volume in the axial direction but rather does add in the radial direction, thus in a direction in which in any case sufficient structural space is available. The rotary transmission leadthrough of the tire pressure control unit according to the invention can be secured on the wheel flange on virtually any wheel or also on the brake drum even if, for example, a universal coupling is provided in the drive line immediately adjacent to the wheel flange.

The expanse of a chamber formed by the two annular bodies extends in the radial direction toward the rotational axis of the wheel and is delimited by the two sealing rings and sealed in this direction. In contrast to prior known tire pressure control units with a concentric disposition of the two annular bodies with respect to one another and the use, absolutely required thereby, of contact seals, the subject matter of the invention provides sealing the chamber with the sealing rings only if the tire pressure is, in fact, to be controlled. Otherwise a sealing should not take place and is also not required. For this purpose, into the stator-side annular body two concentrically disposed annular grooves (groove) are introduced, into each of which a sealing ring is placed. The back end of each groove is connected to a control line such that the grooves can be pressurized. Pressurization subsequently results in a movement of the inserted sealing rings toward the rotor-side annular body until the seals contact the rotor-side annular body. In this position of the sealing rings the chamber delimited by the sealing rings is sealed. After completion of the aeration or deaeration process of the tire, the grooves are again brought into their pressureless state, such that the sealing rings, due to the natural imbalance of the two annular bodies with respect to one another, are again slightly pressed into the grooves. This sealing measure leads only to a very slight seal wear since an actual contact and wear contact is only given at those points in time at which tire aeration or tire deaeration takes place. Moreover, the sealing rings can have a specific material rating such that replacement of the sealing rings can be adapted to specific maintenance cycles of the motor vehicle.

From the rotor-side annular body terminates an output line, for example a bore, in the chamber such that a pressure means introduced into the chamber can be supplied to the tire via this output line.

The chamber of the rotary transmission leadthrough for transmitting the pressure means can be formed alone thereby that the radial delimitation takes place by the sealing rings. However, if it is provided that between the two annular bodies only a narrow motion gap is left, it can be provided to introduce into one of the two or also into both facing components of the chamber delimitation, given by the annular bodies, a groove enlarging the cross section of the chamber.

The tire pressure control unit according to the invention is suitable for operating an introduction system as well as also for operating a two- or multiline system. In a two- or multiline system each chamber is delimited by two seals in the described manner. It can therein be provided that two adjacent grooves are separated from one another by a single common seal.

A useful implementation provides disposing in a sealing groove, in addition to a first sealing ring set thereinto through the pressurization, a further sealing ring which serves for contacting the rotor-side annular element. The properties of the first sealing ring serve for sealing the groove. The further sealing ring has an especially high abrasion and thermal resistance, such that through the properties wear of the seals during their contacting of the rotor-side annular body is reduced.

Further advantages and developments of the invention are described in the following description of an embodiment example of the invention with reference to the enclosed Figures.

DETAILED DESCRIPTION OF THE INVENTION

Figure 1:
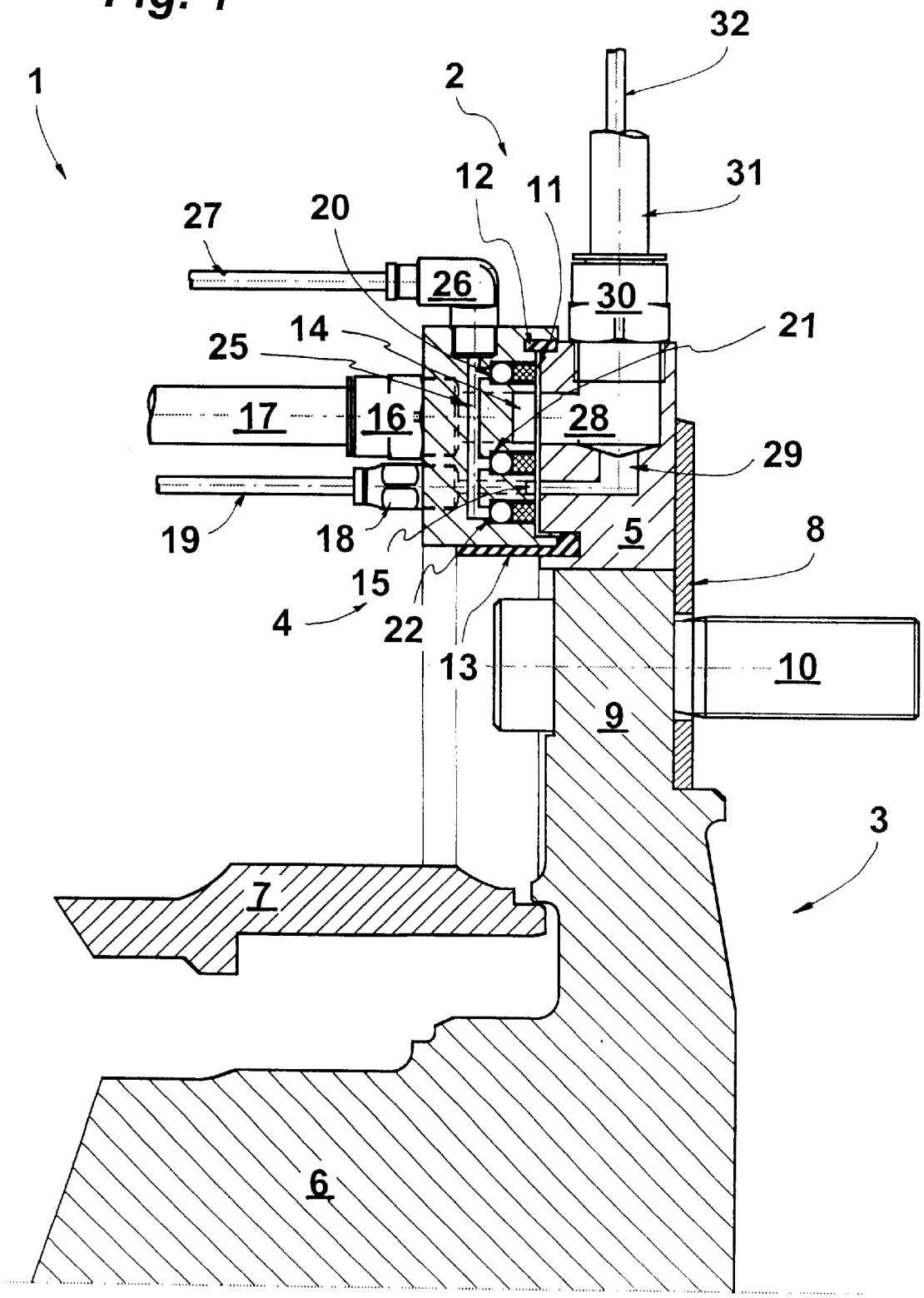
FIG. 1 is a schematic partial cross section through a wheel flange with a rotary transmission leadthrough disposed thereon of a tire pressure control unit.

Aside from further, not shown, components, a tire pressure control unit 1 comprises a rotary transmission leadthrough 2 for transmitting a pressure means from the part, stationary with respect to a rotatably supported wheel 3, of a motor vehicle to the wheel 3. The rotary transmission leadthrough 2 comprises two annular bodies 4, 5 disposed adjacent to one another axially with respect to the rotational axis of wheel 3, wherein the annular body 4 is secured on the stator side and consequently on the motor vehicle, and the annular body 5 at the rotor side and thus on wheel 3. The annular body 4 is stayed in a manner not shown, on the axle beam 7 encompassing the drive line 6. The rotor-side annular body 5 is secured on the wheel flange 9 of the wheel 3 by means of a securement flange 8. It can therein be provided that the securement flange 8 is secured together with the rim by the wheel nuts to be screwed onto the wheel bolt 10. Between the two annular bodies 4, 5 is left a motion gap 11, which is sealed in the radial direction by two concentrically disposed guidance bands 12, 13 against the penetration of impurities such as dirt and/or water. Into the face of the stator-side annular body 4 delimiting the motion gap 11 are introduced two annular chambers 14, 15, disposed concentrically with respect to one another, for the transmission of a pressure means. The chamber 14 serves as a working chamber for transmitting a pressure means, for example air, required for filling the tire; the chamber 15 serves as a signal chamber for transmitting a pressure means for actuating a filling valve associated with the tire. The working chamber 14 is provided to be considerably larger with respect to its cross sectional area than the signal chamber 15 in order for the aeration or deaeration of the tire to be carried out in a short time.

The annular working chamber 14 is connected via an axial bore with a working connection 16 and it with a working line 17, which, in turn, is connected via a working valve with a pressure means store tank. In corresponding manner, the signal chamber 15 is connected via a connection 18 to a signal line 19, which, in turn, is connected to a control valve and a pressure means store tank.

Figure 3:
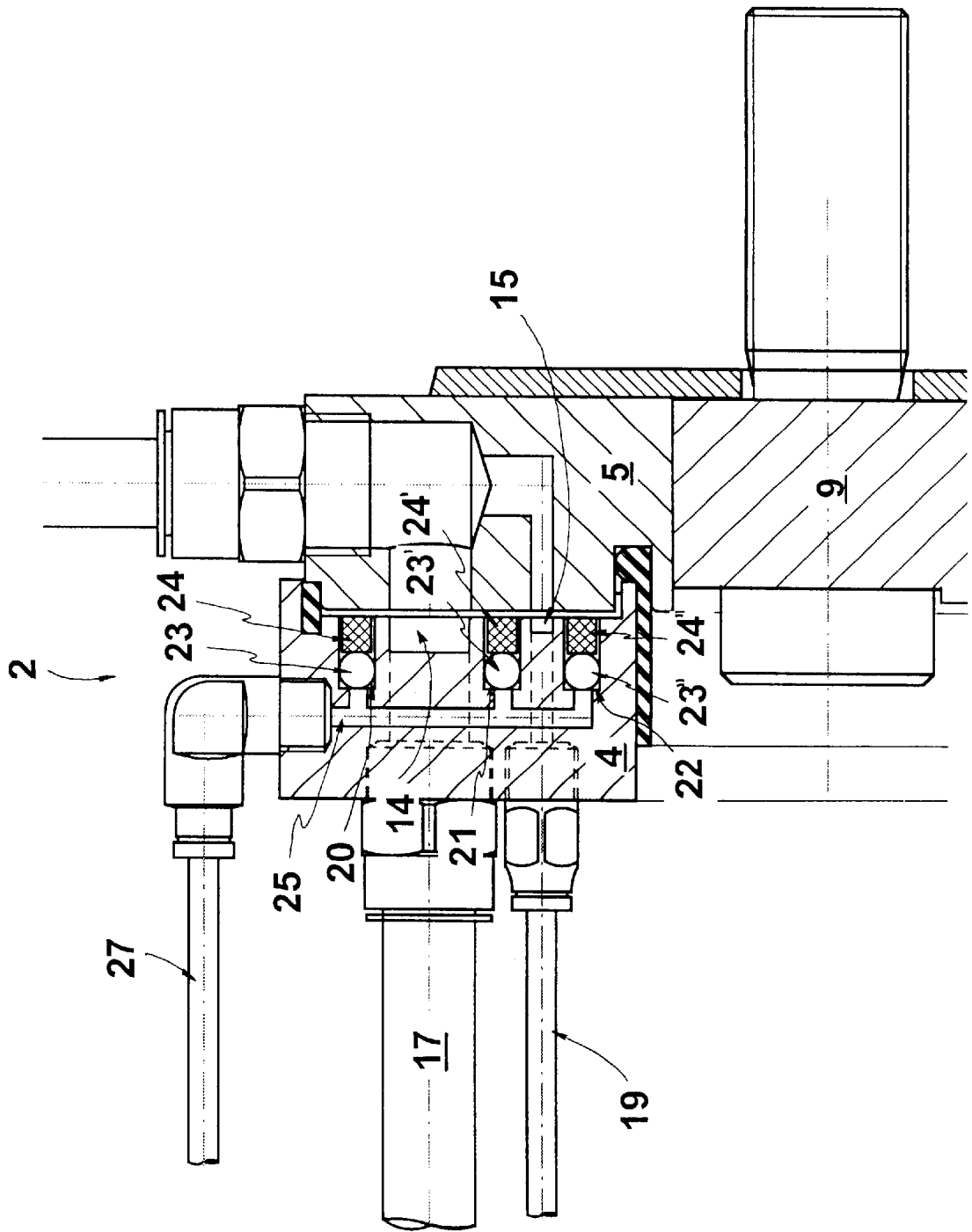
FIG. 3 is an enlarged representation of the rotary transmission leadthrough of FIG. 1 in its non-operating position.
Figure 4:
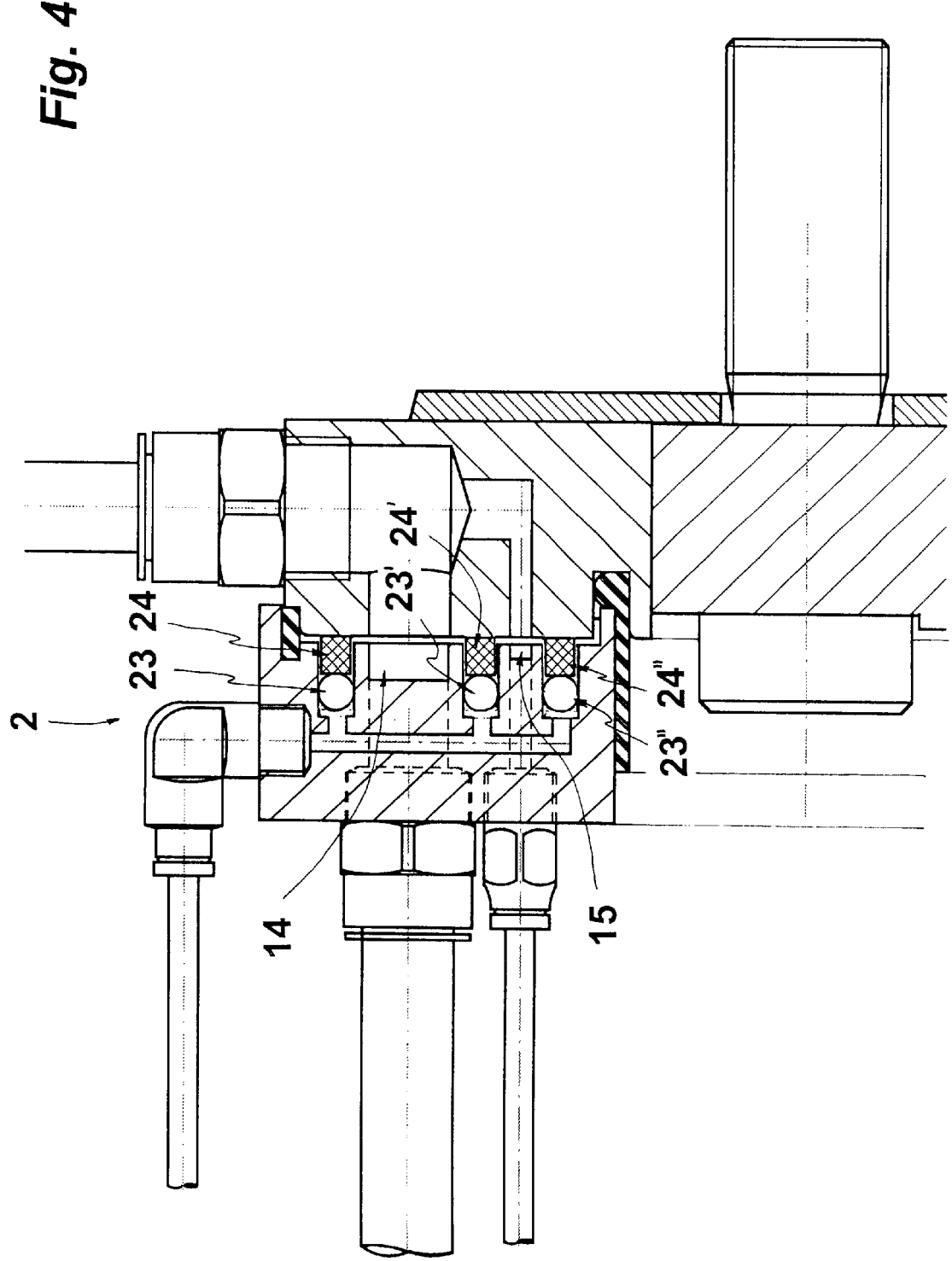
FIG. 4 is the rotary transmission leadthrough of FIG. 3 in its operating position.

Concentrically with the two chambers 14, 15 in the stator-side annular body 4 adjacent to each chamber 14, 15, starting from the motion gap 11, are introduced annular grooves 20 to 22 each of which serves for receiving a sealing ring configuration each comprising two sealing rings 23, 24; 23',24'; 23", 24", shown in greater detail in FIGS. 3 and 4. The back end of each annular groove 20 to 22 is connected with a control channel 25 radially connecting annular grooves 20 to 22 with a control connection 26 disposed radially with respect to the stator-side annular body 4 and a control line 27 disposed on the control connection 26. It can be provided that, instead of the one control connection 26, several control connections, distributed circumferentially, with corresponding control channels can be provided in order to support the uniform pressurization of the annular grooves 20 to 22. The sealing ring 23, 23',23" of each sealing ring configuration is developed in the depicted embodiment example as an O-ring and serves for sealing the annular grooves 20, 21, 22 against the pressure means in the control channel 25. The second sealing ring 24, 24', 24" of each sealing ring configuration serves for contacting the rotor-side annular body 5 and, for this reason, is developed to be especially abrasion resistant and thermally stable. The first sealing ring 23, 23', 23" can be developed as a conventional O-ring, while the second sealing ring 24, 24', 24" can comprise sintered Teflon. Each sealing ring configuration in each annular groove 20 to 22 represents virtually a piston which, upon pressurization of the control line 27 and corresponding to the back regions of the annular grooves 20 to 22, tends to be pressed out of the annular grooves 20 to 22 and into the motion gap 11. Consequently, such pressurization leads to the fact that the front sides of the second sealing rings 24, 24', 24" come to rest in contact on the face delimiting the motion gap 11 on the side of the rotor-side annular body 5. The chambers 14, 15 are subsequently sealed in the radial direction.

Figure 2:
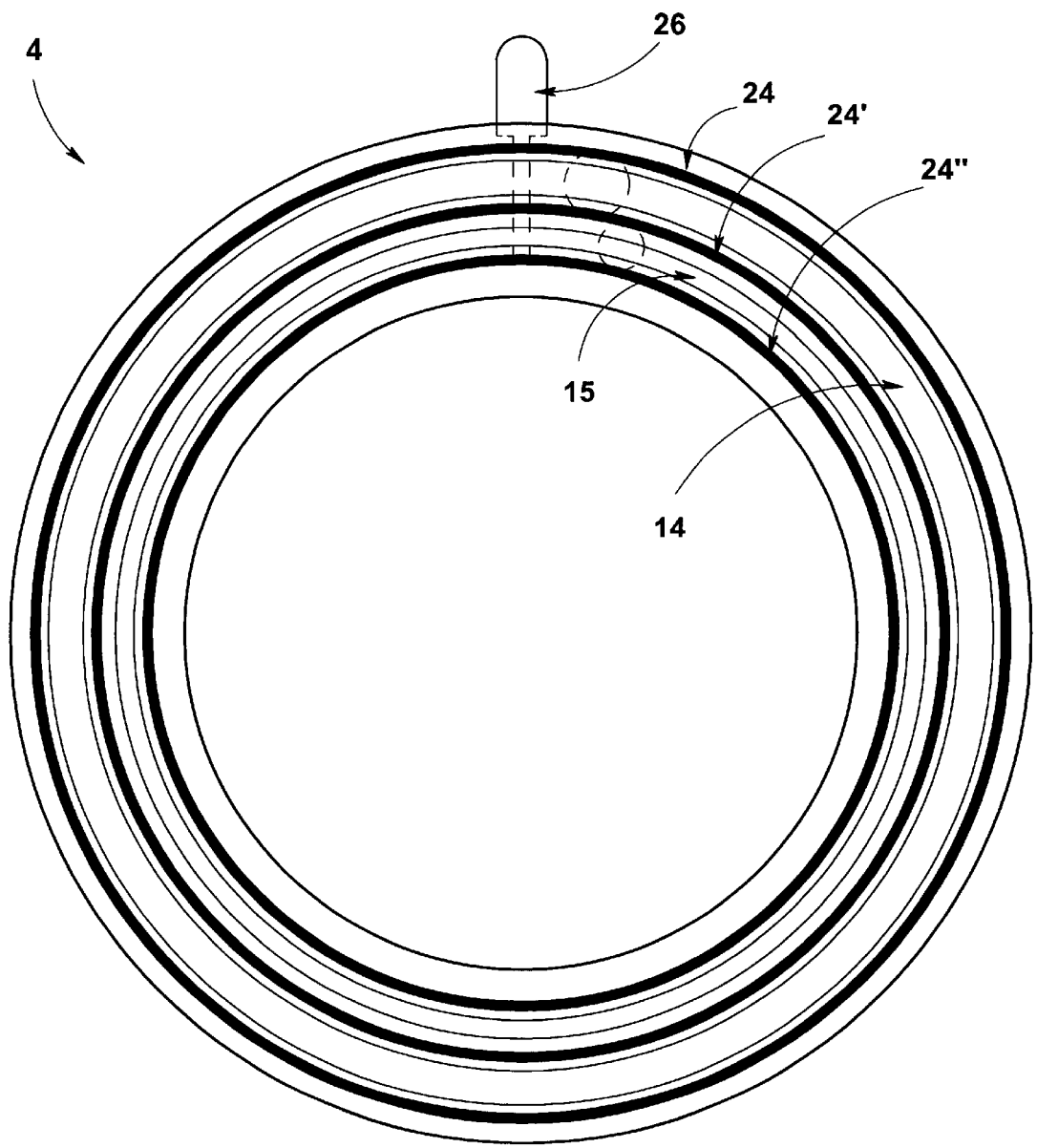
FIG. 2 is a schematic front view onto the stator-side annular body of the tire pressure control unit of FIG. 1.

The concentric disposition of the discrete elements of the stator-side annular body 4 is evident, as well as the control connection 26, in FIG. 2.

In the axial direction aligned with the chambers 14, 15 are introduced through-channels 28, 29 into the rotor-side annular body 5, which, in the embodiment example depicted, form each, bent at a right angle, a connection to an output connection 30 disposed on the rotor-side annular body 5. In FIG. 1 is evident the output connection (working output) 30, on which the rotor-side working line 31 is connected leading to the tire. The signal output is located in the representation of FIG. 1 behind the working output 30; evident is solely the signal line 32, going from the signal output, connected to the filling valve.

The tire pressure control unit 1 depicted in the Figures, in particular the rotary transmission leadthrough 2 is only pressurized during operation of the tire pressure control unit 1. Otherwise the rotary transmission leadthrough 2 is pressure-less since after an operation of the tire pressure control unit 1 the lines 17, 19, 27, 31, 32 are deaerated. This non-operation condition of the tire pressure control unit 1, in particular of the rotary transmission leadthrough 2, is shown in FIG. 3. The two sealing rings 23, 24, 23', 24', 23", 24" of each sealing ring configuration are disposed within the annular grooves 20, 21 and 22. The front second sealing rings 24, 24', 24" are not in contact on the rotor-side annular body 5. If a tire pressure control is desired, the control line 27 is pressurized such that the sealing configurations are pressed out of the annular grooves 20–22 so far that the sealing rings 24, 24', 24" are in contact on the front side on the side facing the motion gap 11, of the annular body 5 (cf. FIG. 4). Through this measure the working chamber 14 is sealed in the axial direction through the sealing ring configuration disposed in the annular grooves 20 and 21 and the signal chamber 15 through the sealing ring configuration disposed in the annular grooves 21 and 22. The signal line 19 can now be pressurized in order to open the filling valve (on the tire) disposed at the end of the rotor-side signal line 32, before the working line 17 is acted upon for the filling of the tire with the pressure means. The transmission of the pressure means takes place via the chambers 15, 14 from the stator-side annular body 4 to the rotor-side annular body 5. After completion of the filling process the signal line 19 is again activated by a pressure means in order to close the filling valve. The lines 17, 18 are subsequently deaerated, which also leads to the deaeration of the lines 31, 32 and consequently of the chambers 14, 15. In a next step the control line 27 is switched pressure-less such that the sealing ring configurations, through the natural imbalance of the two annular bodies 4, 5 with respect to one another, are thrust so far into the annular grooves 20, 21, 22 such that annular body 5 moves past these without contacting.

The depth of the second sealing rings 24, 24', 24" is usefully dimensioned such that with proper use of the tire pressure control unit 1 a wearing of these second sealing rings 24, 24', 24" corresponds approximately to that time period, after which maintenance work has to be carried out on the wheel in any event. Of advantage in the tire pressure control unit 1 according to the invention is, in particular, also the automatic readjustment of the sealing ring configurations for the compensation of occurring wear phenomena, without sealing rings 24, 24', 24" having to be replaced to ensure satisfactory tightness.

The term "annular body" used within the scope of these explanations, defines annular bodies which can be separate subject-matter units, such as depicted for example in the embodiment example described by the Figures or also part of another structural element, for example of the wheel flange or of the rim of a wheel to be mounted on the wheel flange. In particular when providing the rotor-side annular body in the rim, maintenance work on the stator-side annular body, in view of possible necessary renewing of the sealing ring configurations used, is especially useful, since for this maintenance only the wheel needs to be removed.

COMPILATION OF THE REFERENCE SYMBOLS

1 Tire pressure control unit
2 Rotary transmission leadthrough
3 Wheel
4 Annular body, stator-side
5 Annular body, rotor-side
6 Drive line
7 Axle beam
8 Securement flange
9 Wheel flange
10 Wheel bolt
11 Motion gap
12 Guidance band
13 Guidance band
14 Working chamber
15 Signal chamber
16 Working connection
17 Working line
18 Connection
19 Signal line
20 Annular groove
21 Annular groove
22 Annular groove
23 23', 23" Sealing ring
24 24', 24" Sealing ring
25 Control channel
26 Control connection
27 Control line
28 Through-channel
29 Through-channel
30 Output connection
31 Working line
32 Signal line

What is claimed is:

1. A rotary transmission leadthrough of a tire pressure control unit for transmitting pressurized fluid from a stationary portion of a motor vehicle to a rotatably supported wheel in order to change pressurization of the wheel, said rotary transmission leadthrough comprising:

(a) a stator-side annular body mountable to a stationary portion of a motor vehicle and having a face portion, at least one chamber defined through said stator-side annular body so as to open at said face portion thereof and provide flow communication with a source of a pressurized fluid, and outer and inner annular grooves formed in said face portion in a concentric and radially spaced relationship with respect to one another such that said one chamber is disposed between and radially spaced from said outer and inner annular grooves;

(b) a rotor-side annular body having a face portion and at least one chamber defined through said rotor-side annular body so as to open at said face portion thereof and provide flow communication with a filling valve associated with a wheel of the motor vehicle rotatable about a rotational axis, said rotor-side annular body being mountable to the wheel such that said annular bodies are disposed concentrically about and extend along the rotational axis of the wheel and are axially spaced apart from one another along the rotational axis so as to define an annular-shaped motion gap between said face portions;

(c) outer and inner sealing ring members inserted into corresponding ones of said outer and inner grooves of said stator-side annular body and being moveable along the rotational axis of the wheel relative to corresponding ones of said outer and inner grooves; and (d) control means defined in said stator-side annular body in flow communication with said outer and inner grooves therein for transmitting a pressurized fluid from an external source to said outer and inner sealing ring members so as to selectively cause movement thereof toward and away from respective sealing contact with said facing portion of said rotor-side annular body that provides radially sealing by said outer and inner sealing ring members across said motion gap respectively outwardly and inwardly of said chambers of said annular bodies for providing flow communication between said chambers so as to transmit pressurized fluid from said one chamber of said stator-side annular body to said one chamber of said rotor-side annular body, as said rotor-side annular body rotates with the wheel relative to said stator-side annular body.

2. The leadthrough as claimed in claim 1, wherein each of said outer and inner sealing members includes a rear sealing ring element for sealing said corresponding one of said outer and inner grooves against leakage of the pressurized fluid therethrough from said motion gap.

3. The leadthrough as claimed in claim 2, wherein said rear sealing ring element is an O-ring.

4. The leadthrough as claimed in claim 2, wherein each of said outer and inner sealing members further includes a front sealing ring element having an annular end portion for extension into and retraction from said motion gap and thereby into and from said sealing contact with said facing portion of said rotor-side annular body.

5. The leadthrough as claimed in claim 4, wherein said front sealing ring is made of an abrasion resistant and thermally stable material.

6. The leadthrough as claimed in claim 1, wherein said chambers through said respective stator-side and rotor-side annular bodies are aligned with one another and have annular shapes.

7. The leadthrough as claimed in claim 1, further comprising:
outer and inner guidance bands concentrically disposed relative to one another and being mounted to and extending between said annular bodies so as to radially close said motion gap at outer and inner circumferences thereof.

8. The leadthrough as claimed in claim 1, wherein said control means includes a control channel extending in radial relationship relative to the rotational axis and interconnecting said outer and inner annular grooves with an exterior source of pressurized fluid.

9. A rotary transmission leadthrough of a tire pressure control unit for transmitting pressurized fluid from a stationary portion of a motor vehicle to a rotatably supported wheel in order to change pressurization of the wheel, said rotary transmission leadthrough comprising:

(a) a stator-side annular body mountable to a stationary portion of a motor vehicle and having a face portion, a working chamber and a control chamber defined through said stator-side annular body so as to open at said face portion thereof and correspondingly provide flow communication with a source of a pressurized working fluid and a source of pressurized control fluid, and outer, middle and inner annular grooves formed in said face portion in a concentric and radially spaced relationship with respect to one another such that said working and control chambers are disposed between and radially spaced from said respective outer, middle and inner annular grooves;

(b) a rotor-side annular body having a face portion and a working chamber and a control chamber defined through said rotor-side annular body so as to open at said face portion thereof and provide separate flow communication with a filling valve associated with a wheel of the motor vehicle rotatable about a rotational axis, said rotor-side annular body being mountable to the wheel such that said annular bodies are disposed concentrically about and extend along the rotational axis of the wheel and are axially spaced apart from one another along the rotational axis so as to define a motion gap between said face portions;

(c) outer, middle and inner sealing ring members inserted into corresponding ones of said outer, middle and inner grooves of said stator-side annular body and being moveable along the rotational axis of the wheel relative to corresponding ones of said outer, middle and inner grooves; and (d) control means defined in said stator-side annular body in flow communication with said outer, middle and inner grooves therein for transmitting a pressurized fluid from an external source to said outer, middle and inner sealing ring members so as to selectively cause movement thereof toward and away from respective sealing contact with said facing portion of said rotor-side annular body that provides radially sealing by said outer, middle and inner sealing ring members across said motion gap respectively outwardly and inwardly of said chambers of said annular bodies for providing flow communication between said chambers so as to transmit pressurized fluid from said chambers of said stator-side annular body to said chambers of said rotor-side annular body, as said rotor-side annular body rotates with the wheel relative to said stator-side annular body.

10. The leadthrough as claimed in claim 9, wherein each of said outer, middle and inner sealing members includes a rear sealing ring element for sealing said corresponding one of said outer, middle and inner grooves against leakage of the pressurized fluid therethrough from said motion gap.

11. The leadthrough as claimed in claim 10, wherein said rear sealing ring element is an O-ring.

12. The leadthrough as claimed in claim 10, wherein each of said outer, middle and inner sealing members further includes a front sealing ring element having an annular end portion for extension into and retraction from said motion gap and thereby into and from said sealing contact with said facing portion of said rotor-side annular body.

13. The leadthrough as claimed in claim 12, wherein said front sealing ring is made of an abrasion resistant and thermally stable material.

14. The leadthrough as claimed in claim 9, wherein said corresponding chambers through said respective stator-side and rotor-side annular bodies are aligned with one another and have annular shapes.

15. The leadthrough as claimed in claim 9, further comprising:

outer and inner guidance bands concentrically disposed relative to one another and being mounted to and extending between said annular bodies so as to radially close said motion gap at outer and inner circumferences of said annular-shaped motion gap.

16. The leadthrough as claimed in claim 9, wherein said control means includes a control channel extending in radial relationship relative to the rotational axis and interconnecting said outer, middle and inner annular grooves with an exterior source of pressurized fluid.

* * * * *